June 19, 1962 R. STWERTKA Re. 25,190

VENTILATING WINDOW SCREEN OR THE LIKE

Original Filed Oct. 12, 1956

INVENTOR.
RICHARD STWERTKA
BY S. B. Schlessel
ATT'Y

United States Patent Office

Re. 25,19(

Reissued June 19, 196.

25,190

VENTILATING WINDOW SCREEN OR THE LIKE

Richard Stwertka, New York, N.Y.

Original No. 2,918,120, dated Dec. 22, 1959, Ser. No. 615,717, Oct. 12, 1956. Application for reissue July 29, 1960, Ser. No. 46,323

2 Claims. (Cl. 160—352)

Matter enclosed in heavy brackets [ ] appears in the original patent but forms no part of this reissue specification; matter printed in italics indicates the additions made by reissue.

This invention relates to window screens and has for its objective the provision of a window screen construction which is capable of restoring the window area available for air penetration that is lost with the present type of window screen due to the area of solid wire mesh in the screen cloth used to prevent entry of insects, etc., and which is further capable of utilizing thermal agitation for the additional release of room air into the outer air, as will hereinafter be shown.

This application is a continuation-in-part of my copending application for Letters Patent upon an improvement in Ventilating Window Screen or the Like, which was filed in the United States Patent Office on September 2, 1953, bearing Serial No. 378,053, now abandoned.

In the present state of the art the window screens, and for that matter door screen as well, now known and used are provided with a wire screen cloth over their entire surface area for the purpose of keeping insects from entering. In the usual type of screen cloth used, which has 16 meshes to the linear inch, or 256 meshes to the square inch, it has been calculated that approximately 25% of its screen area is solidly wire mesh, resulting in approximately 25% of said screen being impenetrable to air. In effect this reduces the amount of normal window area available to air penetration.

One of the principal objects of my invention, therefore, is the provision of a window screen which will provide additional areas of air-entry to compensate for the area loss caused by the solidity of the wire mesh screen.

Another important object of my invention is to facilitate the passage of outer air into a room and the release of room air into the outer air.

A further important object of my invention is the provision of a structure adapted to restore the window area available to air entry which is blocked in the ordinary screen by the wire meshes.

A fourth important object of my invention lies in the provision of a window screen construction to enforce the natural air conditioning of a room which would be impaired and impeded by the old fashioned type of window screen.

Still another important object of my invention lies in the simplicity and economy of construction, as well as its adaptability.

Still other important objects, advantages and functional features of my invention, together with the novel features of construction, combination and arrangement of parts, will more readily appear from an examination of the following description, taken with the accompanying drawings which shows a preferred embodiment of my invention, wherein.

Similar reference characters designate similar parts throughout the different views.

Illustrative of the embodiment shown and described by

Figure 1:
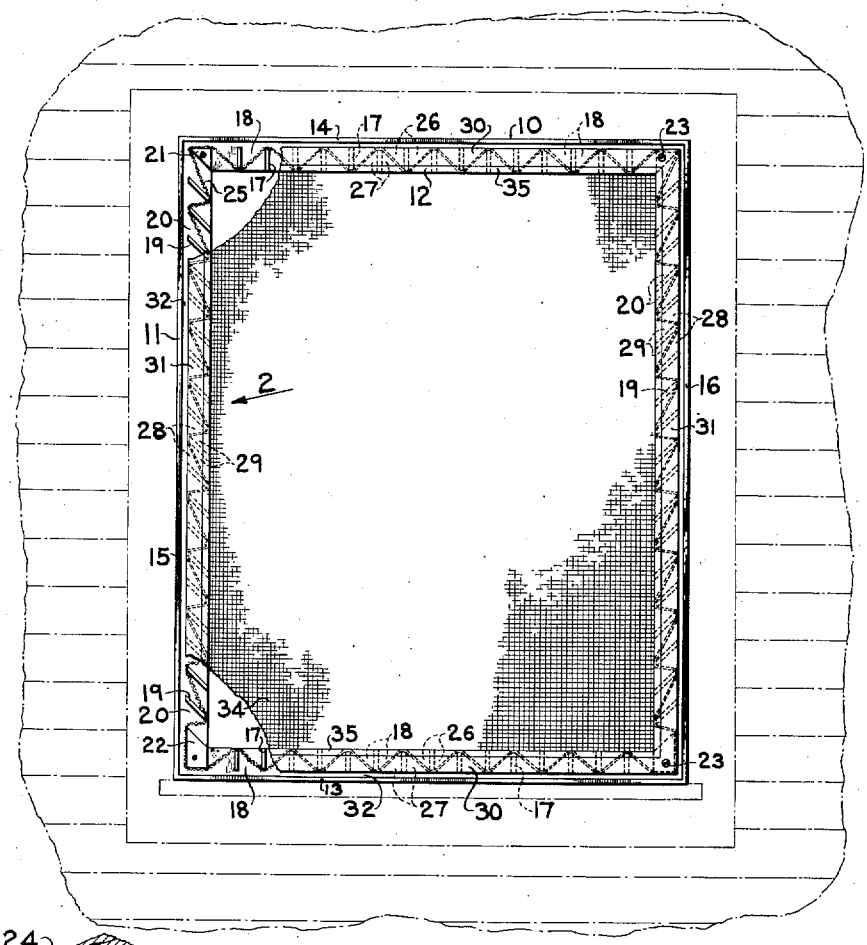
FIG. 1 is a front view of my invention showing window screen positioned within a window.
Figure 2:
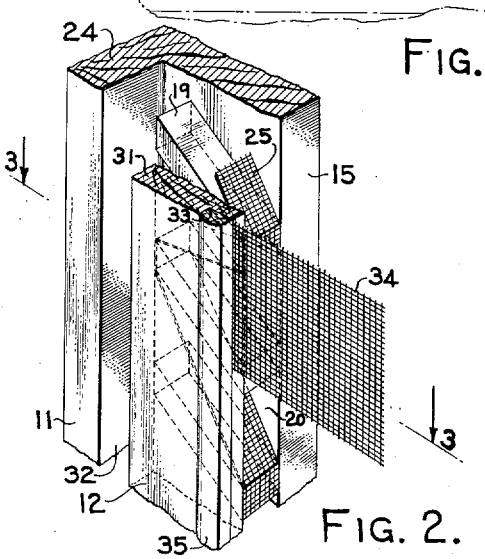
FIG. 2 is an enlarged fragmentary perspective view taken in the direction of arrow 2 of FIG. 1.
Figure 3:
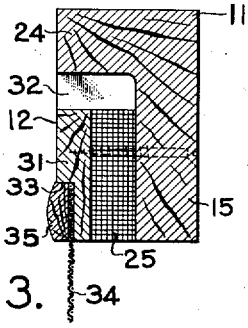
FIG. 3 is a cross-sectional view, taken on line 3—3 of FIG. 2.

FIGS. 1, 2 and 3, my invention comprises a window scree frame construction 10 comprising an outer frame 11 an an inner frame 12 secured to each other as will hereinaft be shown. The outer frame 11 is comprised of a botto rail 13, a top rail 14 and a pair of stiles 15 and 16, a sembled with mitred corners and secured to each oth by suitable means to form a four-sided frame.

A plurality of rectangular spacing strips 17 of pr calculated depth are arranged vertically upon the fro face of the bottom rail 13 and the front face of the to rail 14, parallel to and equidistant from each other, shown, and permanently secured to the faces there by usual means, creating between them a plurality channels 18.

A plurality of parallelopiped spacing strips 19 of th same pre-calculated depth are arranged upon the faces the stiles 15 and 16, parallel to and equidistant fro each other, as shown, and permanently secured to th faces thereof in fixed position by usual means, definin between them a plurality of channels 20.

The corners of the outer frame 11 are provided wit blocks 21 and 22 having the same depth as the strip 17 and 19, to which the inner frame 12 is secured to th outer frame 11 by means of screws 23. The outer fram 11 is further provided around its perimeter with a flang 24 projecting at right angles thereto to a height sub stantially twice the depth of the strips 17 and 19.

A strip of wire screen cloth 25, having a width equa to the depth of the strips 17 and 19, is uninterruptedl wound around the edges of the strips 17 and 19 in zigza fashion so as to define a complete enclosure of the oper ing defined by the outer frame 11, in height equivalent t the depth of the strips 17 and 19, the screen cloth 2 being secured to the edges of the strips 17 and 19 an the blocks 21 and 22. The combination of screen clot 25 and the strips 17 thereby divided channels 18 diagonal ly into upper channels 26 and lower channels 27, an the combination of the screen cloth 25 and the strips 1 thereby divides channels 20 into upper channels 28 an lower channels 29.

The inner frame 12 is composed of rails 30 and stile 31, assembled with mitred corners and secured togethe in the same fashion as outer frame 11, the rails 30 an stiles 31 being shorter in length than those of outer fram 11 to define a smaller frame which, when secured to th outer frame 11, is adapted to define between the frame an air gutter 32 between the outer edge of the inne frame 12 and the inner edge of the inner frame 24, a shown.

The inner frame 12 is provided with a recess 33 aroun the inner edge. A shielding wire screen 34 is provide upon the frame 12 to cover the opening defined thereby the edges of the wire screen 34 fitting into the recess 3 and secured therein by means of molding 35 fitting int the recess 33 and secured thereto and to the frame 12 b brads or other suitable means.

The inner frame 12 is secured to the outer frame 11 b means of the screws 23 as described, so that the back o the frame 12 fits tightly against the upper surface o the strips 17 and 19, defining between them the channel 18 and 20, leading from the inside or back of the com bined frames to the front or outer air through the ai gutter 32, the air passageway thereby defined being guarded against the entry of insects therethrough by mean of the barrier screen strip 25.

The parts of construction of my invention may be o wood, metal, composition, plastic or any other material or any combination of the same, which are practical and suitable for the purposes indicated. The frames and strips shown in the embodiment hereinabove described are of wood for purposes of illustration.

The operative use of my invention, the embodiment wn by FIGS. 1–3, is assembled as shown and described, placed within the window frame. The plurality of carrying channels 18 and 20 form additional air ning, supplementary to the air openings in the wire shes of the shielding wire screen 34, thus compensat- for the loss of air area necessitated by the solidity the wire meshes of the screen 34 blocking air com- nication through the faces of the frame.

Assuming that the total sum of cross-sectional areas the plurality of air carrying channels 18 and 20 has n made at least equal to the air-penetration loss sed by the solidity of the wire meshes of the screen this loss is completely compensated for as though the e mesh screen 25 provided no resistance whatever to communication betwen the room air and the outer The effect of venting is created with the plurality of carrying channels 18 and 20 and will facilitate an hange of room air with outer air.

t is to be understood that although all references einafter have been made to window screens it is to be arly understood that the invention as well applies to or screens and other forms of air entries.

The embodiment shown and described is by way of stration only, and various changes may be made in construction and arrangement of parts, as well as stitution or equivalents, without limitation upon or arture from the spirit and scope of the invention, or rificing any of the advantages thereof inherent there- and the illustrations are not intended as limitations.

Having described my invention, I claim:

[1. A screen comprising in combination an inner frame l an outer frame secured together in spaced apart ationship, said outer frame comprising frame members L-shaped cross section, one of the legs of each said hape member being in the plane of said frame and the er of said legs being perpendicular thereto, said inner me comprising members each positioned in the space ined by said legs of one of said outer frame members l being spaced from said legs, a plurality of spacer cks positioned between said first leg of each outer me members and said inner frame members, said cers being mounted in parallel relationship with re- ct to each other along the inner surface of said first leg, a screen positioned in the inner frame, and second screen means secured between said inner and outer frames, and woven between the spacer blocks.]

*2. A screen construction comprising in combination an inner frame and an outer frame secured together in spaced apart relationship, said outer frame comprising frame members of L-shaped cross section, one of the legs of each said L-shaped member being in the plane of said frame and the other of said legs being perpendicular thereto, said inner frame comprising members each positioned in the space defined by said legs of said outer frame members and being spaced from said legs respectively, a plurality of spacer blocks positioned between said first leg of said outer frame members and said inner frame members, said spacers being mounted in parallel relationship with respect to each other along the inner surface of said first leg, a screen positioned in the inner frame, and second screen means secured between said inner and outer frames, and woven between the spacer blocks.*

*3. A screen construction comprising in combination an inner frame and an outer frame secured together in spaced apart relationship, said outer frame comprising frame members of L-shaped cross section, one of the legs of each said L-shaped member being in the plane of said frame and the other of said legs being perpendicular thereto, said inner frame comprising members each positioned in the space defined by said legs of said outer frame members and being spaced from said legs respectively, a plurality of spacer blocks positioned between said first leg of said outer frame members and said inner frame members, said spacers being mounted in parallel relationship with respect to each other along the inner surface of said first leg, a screen positioned in said inner frame, and second screen means secured between said inner and outer frames.*

References Cited in the file of this patent or the original patent

UNITED STATES PATENTS

| | | |
|---|---|---|
| 726,210 | Wright | Apr. 21, 1903 |
| 919,361 | Keen | Apr. 27, 1909 |
| 1,139,574 | Pitcher | May 18, 1915 |
| 1,630,808 | Siegerdt | May 31, 1927 |